(No Model.)

G. S. LATTA.
Combination Fork and Rake.

No. 243,583.    Patented June 28, 1881.

WITNESSES:
Francis McArdle,
C. Sedgwick

INVENTOR:
G. S. Latta
BY Munn & Co.
ATTORNEYS.

UNITED STATES PATENT OFFICE.

GEORGE S. LATTA, OF BEREA, NORTH CAROLINA.

COMBINATION FORK AND RAKE.

SPECIFICATION forming part of Letters Patent No. 243,583, dated June 28, 1881.

Application filed April 28, 1881. (No model.)

*To all whom it may concern:*

Be it known that I, GEORGE SIMPSON LATTA, of Berea, in the county of Granville and State of North Carolina, have invented a new Improvement in Combination Forks and Rakes, of which the following is a full, clear, and exact description.

Figure 1:
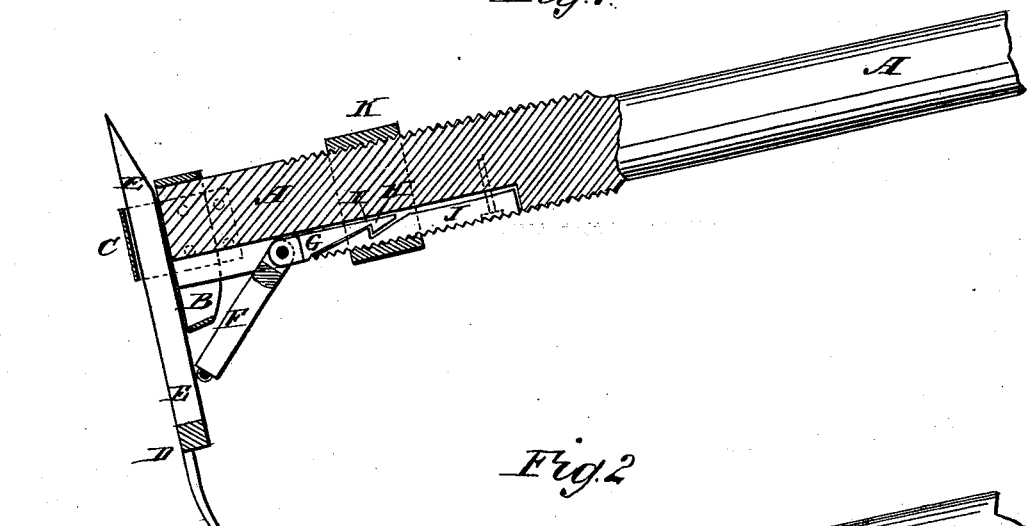
Figure 2:
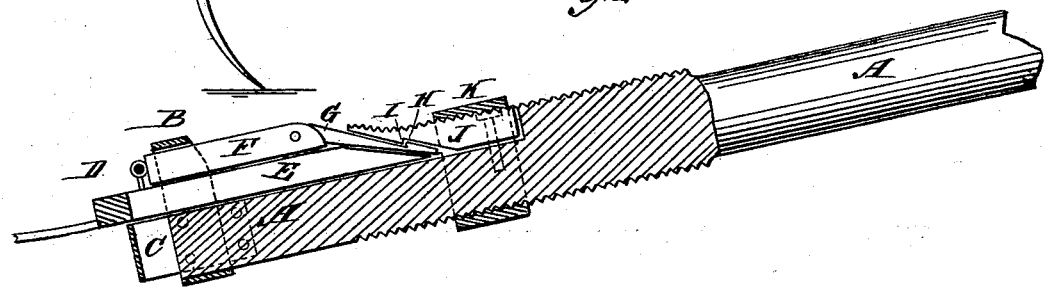
Figure 3:
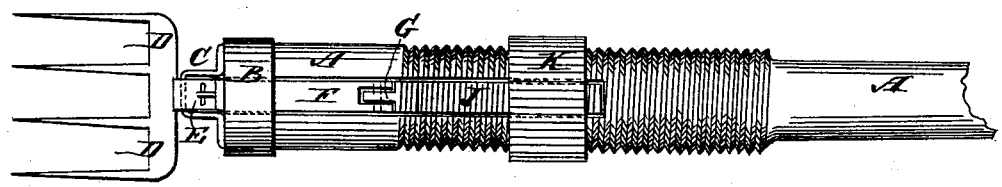

Figure 1 is a sectional side elevation of my improvement adjusted as a rake. Fig. 2 is a sectional side elevation of the same adjusted as a fork. Fig. 3 is a plan view of the same adjusted as a fork.

The object of this invention is to furnish combination forks and rakes which can be readily adjusted for use in either capacity.

The invention consists in constructing a combination fork and rake with a handle having sockets or keepers attached to its end, a head having a shank, a jointed brace hinged to the shank, and having a shoulder upon its rear part, the locking-bar having a corresponding shoulder, and a screw-band for clamping the various parts of the implement together, whereby the implement can be readily adjusted as a fork or a rake, as will be hereinafter fully described.

A represents the handle, to the forward end of which is attached a band, the upper side of which projects to form a socket or keeper, B. To the opposite sides of the end of the handle A is attached a strap to form a socket or keeper, C.

The two sockets or keepers B C can be made in one piece, or firmly attached to each other before being applied to the handle A.

The fork-head D can be made with two, three, four, or more tines or teeth, and has the forward side of the end of its shank E beveled, as shown in Figs. 1 and 2.

To the forward side of the shank E, near the head D, is hinged the end of a brace, which is made in two parts, F G, hinged or jointed to each other. The part G of the brace is tapered, and has a shoulder, H, formed upon it to interlock with a similar shoulder, I, formed upon the inner side of the forward part of the bar J, which is placed in a groove in the forward side of the forward end of the handle A, and is secured at its rear end to the said handle by a screw or other suitable means.

Upon the outer surface of the forward end of the handle A, or upon a metal band placed upon the said handle, and upon the outer side of the locking-bar J, is formed a screw-thread, into which fits a screw-thread formed in the inner surface of a band, K, as shown in Figs. 1 and 2.

The keepers B C can be formed solid with or securely attached to the stationary screw-band before the said band is placed upon the handle, so as to greatly strengthen the attachment.

With this construction, when the implement is to be adjusted as a fork, the hinged and jointed brace F G is laid upon the shank E, with the outer part, G, resting upon the bevel of the said shank E, and the shank and brace are passed through the socket or keeper B, and beneath the forward end of the bar J, the shoulders H I interlocking with each other. The band K is then screwed forward and clamps the various parts of the implement in place, producing a firm and substantial fork. When the implement is to be adjusted as a rake the shank E is inserted in the socket or keeper C, the part F of the brace is passed over the socket or keeper B, the part G of the said brace is slipped beneath the locking-bar J, and the band K is screwed forward, clamping the various parts of the implement securely in place, and forming a firm and substantial rake.

Having thus described my invention, what I claim as new, and desire to secure by Letters Patent, is—

1. A combination-tool constructed substantially as herein shown and described, consisting of the handle A, the sockets or keepers B C, attached to the said handle, the head D, having shank E, the jointed brace F G, having shoulder H, the bar J, having shoulder I, and the screw-band K, as set forth.

2. In a combination-tool, the combination, with the handle A, having sockets or keepers B C attached to its end, of the head D, having shank E, the hinged and jointed brace F G, having shoulder H, the locking-bar J, having shoulder I, and the screw-band K, substantially as herein shown and described, whereby the implement can be readily adjusted as a fork or as a rake, as set forth.

GEORGE SIMPSON LATTA.

Witnesses:
J. H. MEADOWS,
R. H. CURRIN.